United States Patent [19]
Dupont et al.

[11] Patent Number: 5,059,411
[45] Date of Patent: Oct. 22, 1991

[54] PROCESS AND APPARATUS FOR THE PRODUCTION OF CARBON MONOXIDE

[75] Inventors: René Dupont, Nogent-sur-Marne; Pierre Gauthier, Fresnes, both of France

[73] Assignee: L'Air Liquide, Societe Anonyme pour l'Etude et l'Exploration des Procedes Georges Claude, Paris, France

[21] Appl. No.: 487,060

[22] Filed: Mar. 2, 1990

[30] Foreign Application Priority Data

Mar. 2, 1989 [FR] France .................. 89 02696

[51] Int. Cl.$^5$ ............... C01B 3/38; C01B 3/36
[52] U.S. Cl. ................. 423/658.3; 422/197; 422/148; 422/173; 422/125; 422/195; 422/189; 423/415 A; 423/648.1
[58] Field of Search ............. 422/197, 173, 148, 125, 422/195, 189; 423/415 A, 648.1, 658.3

[56] References Cited

U.S. PATENT DOCUMENTS

| | | |
|---|---|---|
| 4,431,566 | 2/1984 | Suzuki et al. |
| 4,553,981 | 11/1985 | Fuderer ............... 422/173 |
| 4,670,187 | 6/1987 | Schurmans et al. ........ 422/189 |

FOREIGN PATENT DOCUMENTS

| | | |
|---|---|---|
| 0018700 | 11/1980 | European Pat. Off. |
| 2640456 | 3/1977 | Fed. Rep. of Germany |
| 2398695 | 7/1977 | France |
| 183101 | 8/1986 | Japan |
| 62-49947 | 3/1987 | Japan |

*Primary Examiner*—David L. Lacey
*Assistant Examiner*—Abanti B. Singla
*Attorney, Agent, or Firm*—Browdy and Neimark

[57] ABSTRACT

Methanol is catalytically cracked (at 4) then the essential portion of the components other than CO is removed by washing with water (at 5), selective adsorption (at 7) and permeation (at 8). The process and apparatus has application to the production of moderate quantity of carbon monoxide.

17 Claims, 1 Drawing Sheet

PROCESS AND APPARATUS FOR THE PRODUCTION OF CARBON MONOXIDE

BACKGROUND OF INVENTION (a) Field of the Invention

The present invention relates to the production of carbon monoxide (CO) by generating a synthesis gas followed by scrubbing of the latter. By "scrubbing", is meant the removal of the essential portion of the components other than CO.

(b) Description of Prior Art

In the usual processes of production of CO, the generation of the synthesis gas is based on a partial oxidation of coke and hydrocarbons such as natural gas, GPL, naphta, residues under vacuum, such as by reforming with oxygen, water vapour or $CO_2$. The synthesis gas is thereafter scrubbed, generally by means of a cryogenic or chemical process.

These processes enable to reach high purities, above 99%, but they rely on complicated equipments which are not well adapted to units of small capacity.

SUMMARY OF INVENTION

An aim of the invention is to provide a more economical technique in the case of units of relatively small capacity.

For this purpose, it is an object of the present invention to provide a process of the type mentioned above, characterized in that the synthesis gas is obtained by catalytic cracking of methanol.

Preferably, the scrubbing stage comprises a removal of the lighter impurities, such as hydrogen, by permeation; according to an advantageous embodiment, it comprises successively;

a washing with water to remove the essential portion of the heaviest impurities produced by cracking, a selective adsorption on adsorbent materials to stop the last traces of these impurities, and said permeation, the residue from this permeation constituting the production.

It is also an object of the invention to provide an apparatus for the production of carbon monoxide (CO), of the type comprising a device for generating a synthesis gas containing CO and a device for scrubbing this gas, characterized in that the device for generating synthesis gas is a device for catalytically cracking methanol.

BRIEF DESCRIPTION OF DRAWINGS

A working example according to the invention will now be described with reference to the annexed drawing, in which.

DESCRIPTION OF PREFERRED EMBODIMENTS

Figure 1:
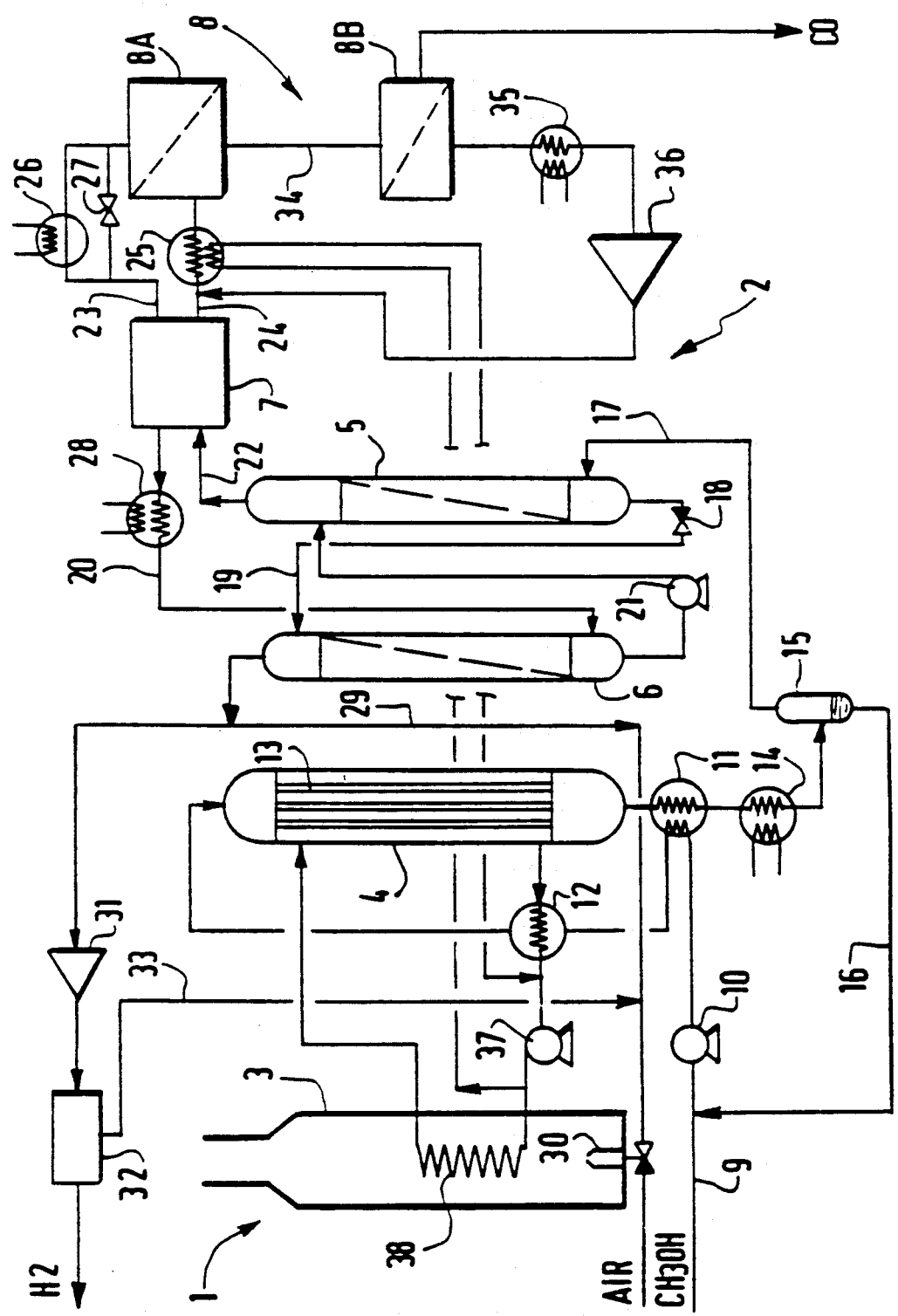
FIG. 1 is a schematic representation of an apparatus according to the invention.

The apparatus represented in the drawing comprises a device 1 for catalytic cracking and a device 2 for scrubbing synthesis gas produced by this device 1. The device 1 comprises an enclosure 3 for heating a heat carrying fluid and a cracking enclosure 4. The device 2 comprises a tower 5 for washing with water which is associated with a tower 6 for the regeneration of washing water, a selective adsorption device 7 of the type TSA (Temperature Swing Adsorption), and a permeation device 8. Methanol $CH_3OH$, arrives in liquid phase via a duct 9, is compressed by means of a pump 10 to a pressure slightly above that of the CO to be produced. In this example, CO under a pressure between 25 and 30 bar is produced, and the methanol is compressed at about 30 bars, so as to take the losses of charge into consideration.

The compressed methanol is preheated in two consecutive indirect heat exchangers 11 and 12, then is introduced into the upper chamber of the enclosure 4, which chamber defines an inlet collector. From there, it is distributed to a certain number of heating ducts 13 of this enclosure, where cracking takes place at 350° C.

The gas thus generated is collected in the lower chamber of the enclosure 4, and is cooled down in two stages, first in the exchanger 11 then in a water circulation indirect exchanger 14. This cooling down produces a recondensation of the essential portion of the methanol which has not been cracked, and the liquid fraction, which is collected in a phase separator 15, is recycled via a duct 16 to the sucking portion of the pump 10. The vapor phase issued from this separator constitutes a synthesis gas which will then be scrubbed and whose typical composition is the following:

| | |
|---|---|
| —$H_2$ | 65.9% |
| —CO | 31.4% |
| —$CO_2$ | 1.1% |
| —$CH_4$ | 0.1% |
| —$(CH_3)_2O$ | 0.4% |
| —$CH_3OH$ | 1.0% |
| —$H_2O$ | 0.1% |

The synthesis gas is sent through a duct 17 to the base of the tower 5, which is fed at its upper part with water circulating in a closed circuit. It is thus possible to remove by absorption the major portion of the $CO_2$, from the remaining methanol and $(CH_3)_2O$. The washing water loaded with these impurities, which is withdrawn in the vat portion of the tower is expanded at about 2 bars in an expansion valve 18 and is sent via a duct 19 to the top of the tower 6, where it is regenerated by stripping with impure hydrogen introduced through a duct 20 at the base of this tower. The regenerated water is withdrawn in the vat portion of the tower 6, recompressed at 30 bars by means of a pump 21 and sent to the top of the tower 5.

The gas in the upper portion of the tower 5 then passes via a duct 22, into the adsorption device 7. This device comprises two adsorbers which operate alternately, each one comprising at least a bed of adsorbent material, for example two beds mounted in series, the first being constituted of activated alumina and the second one comprising activated charcoal. In this manner, it is possible to eliminate gas, water and residual traces of $CO_2$, $CH_3OH$ and $(CH_3)_2O$. The regeneration of the adsorbers is carried out by means of impure hydrogen which circulates through a duct 23. To operate device 7, any appropriate cycle may be used, which is well known in the TSA technology.

The gas which exits from the device 7 through duct 24, and which is composed nearly exclusively of CO and hydrogen, is reheated at about 90° C. in an indirect heat exchanger 25 and is sent to the first stage 8A of the permeation device 8, where the major portion of hydrogen is removed. The permeated product, which consists of about 95% hydrogen and 5% CO under about 2 bars, is cooled down in an indirect water heat exchanger 26, then is used for the phase of cooling the adsorbent material of the device 7 or is directly sent to the device 7 through a by-pass 27 of the exchanger 26 for the phase of heating the adsorbent material. At its exit from the device 7, this impure hydrogen is cooled down in an indirect water heat exchanger 28, then is sent, via duct 20, to the base of the regeneration tower 6.

In variant, as also represented in the drawing, the gas in the head portion of the tower 6 can be upgraded, for example by producing pure hydrogen by compression at 31 then purification by PSA adsorption (Pressure Swing Adsorption) at 32. The residual gas from this adsorption is then sent to the burner 30 via duct 33 to be used as combustion gas, with, if necessary, an addition of combustion gas directly brought in from the top of tower 6 via duct 29.

The residue from the permeation stage 8A is sent through a duct 34 to the second stage 8B of the device 8. The premeated product from this second stage, containing about 65% CO, is cooled down with an indirect water heat exchanger 35, compressed at 36 and recycled in the duct 24, upstream of the exchanger 25. The residue from stage 8B constitutes the gas which is produced in the apparatus and contains by way of impurities less than 0.4% hydrogen, less than 0.4% methane and traces of $CO_2$, $(CH_3)_2O$, $CH_3OH$ and water. The purity of carbon monoxide which is thus produced is higher than 99%.

The heat carrier fluid (oil) which is used for cracking methanol is allowed to circulate through a pump 37 between a coil 38 located in the enclosure 3, and the roller of enclosure 4, via exchanger 12. A portion of this fluid is derived from the main circuit and serves to heat the exchanger 25.

The synthesis gas whose composition has been indicated above is particularly advantageous for its low content of $CO_2$ and methane (the later component being concentrated in the CO product). This favourable result could be obtained with the help of chromium-zinc catalysts without copper, an example being the catalyst containing 35.5% $Cr_2O_3$ and 64.3% ZnO which is commercialized under the designation (KMA) by Catalysts and Chemical Europe Society.

We claim:

1. An apparatus for the production of a carbon monoxide-containing product gas, comprising, in serial arrangement in a production line:
   means for catalytically cracking methanol and producing a synthesis gas comprising essentially hydrogen and carbon monoxide;
   washing means for substantially eliminating from said synthesis gas the heaviest components therein;
   absorption means for eliminating from said synthesis gas residual heaviest components and discharging a substantially first dual components hydrogen/carbon monoxide effluent gas;
   first permeation means for producing from said effluent gas a purified carbon monoxide-containing product stream and waste gas stream containing hydrogen,
   further comprising means for recirculating at least a portion of said waste gas stream into said line, downstream from said cracking means.

2. The apparatus of claim 1, wherein said first permeation means comprises, serially arranged, first and second permeators.

3. The apparatus of claim 2, wherein said recirculation means is constructed so that the waste gas stream from said first permeator means is circulated through said adsorption means.

4. The apparatus of claim 3, wherein said washing means comprises a renegeration device for renegerating a washing medium said recirculation means is constructed so that said waste gas stream is circulated through said adsorption means and is circulated through said regeneration device.

5. The apparatus of claim 4, further comprising a second permeation means and said recirculation means is constructed so that said waste gas stream is circulated through said regeneration device and is supplied to said second permeation means for producing substantially pure hydrogen.

6. The apparatus of claim 3, wherein said second permeator is in flow communication with said first permeator so as to introduce said waste gas stream in said effluent gas supplied to said first permeator.

7. The apparatus of claim 5, wherein said cracking means comprises heating means.

8. The apparatus of claim 7, further comprising an heat exchanging means for heating said effluent gas supplied to said first permeation means.

9. The apparatus of claim 8, wherein said heat exchanging means is in thermal connection with said heating means.

10. The apparatus of claim 7, wherein said cracking means comprises a catalytic cracking reactor including a substantially copper-free chromium-zinc based catalyst.

11. A process for the production of a carbon monoxide-containing product gas, which comprises the following steps:
    cracking a methanol gas stream in a catalytic reactor for producing a synthesis gas comprising essentially hydrogen and carbon monoxide;
    washing said synthesis gas in washing means to substantially eliminate therefrom the heaviest components;
    passing said washed synthesis gas to adsorption means to remove residual components and produce a substantially dual components, hydrogen/carbon monoxide effluent gas;
    passing said effluent gas to first permeation means to produce a purified carbon monoxide-containing product stream and a hydrogen-containing waste gas stream; and
    recirculating at least a portion of said waste gas stream to at least said adsorption means.

12. The process of claim 11, wherein said washing means comprises a regeneration device for regenerating a washing medium, further comprising the step of supplying a portion of said waste gas stream to said renegeration device.

13. The process of claim 21, wherein said regeneration device employs a regeneration medium and said renegeration medium is water.

14. The process of claim 12, further comprising the step of passing a portion of said waste gas stream supplied to said regeneration device to a second permeation means to produce substantially pure hydrogen as a byproduct.

15. The process of claim 14, wherein said catalytic reactor is heated by burning a combustible gas, further comprising the step of injecting a permeated gas from said second permeation means into said combustible gas.

16. The process of claim 11, wherein said cracking is carried out in the presence of a substantially copper-free, chromium-zinc based catalyst.

17. An apparatus for the production of carbon monoxide, comprising:

cracking means for cracking methanol and producing a first stream of methanol and a second stream of synthesis gas which is predominantly hydrogen and carbon monoxide and which further contains small amounts of carbon dioxide, methane, methanol, water and $(CH_3)_2O$ as impurities;

means for recycling said first stream of methanol to said cracking means;

first purification means for said synthesis gas, in flow communication with said cracking means, for partially purifying said synthesis gas to remove some of said impurities therefrom, said first purification means comprising water washing means for washing said synthesis gas;

second purification means for further purifying said synthesis gas in flow communication with said first purification means, said second purification means comprising adsorption means for removing substantially the remainder of said impurities from said synthesis gas to provide a purified synthesis gas containing substantially only hydrogen and carbon monoxide;

hydrogen removal means for removing hydrogen from said purified synthesis gas, said hydrogen removal means in flow communication with said second purification means and comprising a first permeation means and a second permeation means, said first permeation means producing (1) a first stream consisting of impure hydrogen with a small amount of carbon monoxide and (2) a second stream comprising predominantly carbon monoxide; said second permeation means in flow communication with said first permeation means for receiving said second stream and producing therefrom (a) carbon monoxide product gas for recovery and (b) a residue gas comprising predominantly carbon monoxide; and residue gas recycling means for recycling said residue gas comprising predominantly carbon monoxide from said second permeation means to said first permeation means.

* * * * *